United States Patent [19]

Teal

[11] 4,093,880
[45] June 6, 1978

[54] MAGNETICALLY OPERABLE ENGINE

[76] Inventor: Benjiman R. Teal, 611 Marion St. NW., Madison, Fla. 32340

[21] Appl. No.: 791,957

[22] Filed: Apr. 28, 1977

[51] Int. Cl.$^2$ .......................................... H02K 41/00
[52] U.S. Cl. ....................................... 310/24; 310/35
[58] Field of Search ...................... 310/23, 29, 34, 35, 310/46

[56] References Cited

U.S. PATENT DOCUMENTS

| | | | |
|---|---|---|---|
| 2,056,719 | 10/1936 | Gelnaw | 310/35 X |
| 2,570,766 | 10/1951 | Chenault | 310/35 |
| 2,588,753 | 3/1952 | Norton | 310/35 |
| 2,639,544 | 5/1953 | Coffin | 310/24 X |
| 3,832,608 | 8/1974 | Mills | 310/24 X |
| 4,019,103 | 4/1977 | Davis et al. | 310/24 X |

*Primary Examiner*—Donovan F. Duggan
*Attorney, Agent, or Firm*—J. Wesley Everett

[57] ABSTRACT

A combination device for developing a mechanical output from electrical energy which uses at least one electrical magnet solenoid, and preferably a plurality of same, together with an associated timing mechanism for actively controlling the time and degree of energization of said electrical magnet(s). Preferably at least one of the electrical magnetic solenoid structures may be provided with an air compressor structure for increasing the normal atmospheric pressure to a desired pressure.

3 Claims, 8 Drawing Figures

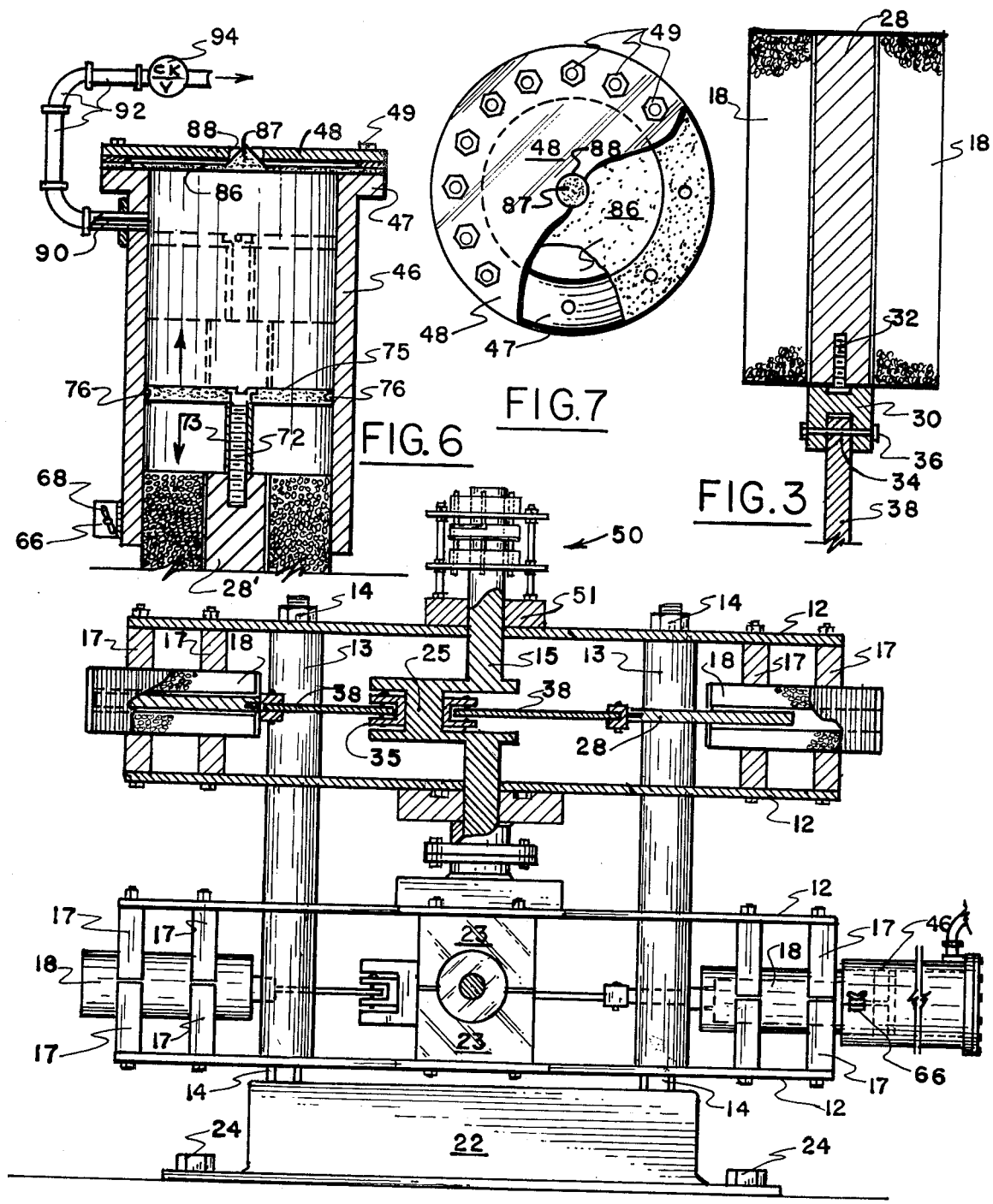

MAGNETICALLY OPERABLE ENGINE

BACKGROUND OF THE INVENTION

1. Field of the Invention

This invention relates generally to devices changing electrical energy into mechanical energy in a form which may be used to power useful work applications.

2. Description of the Prior Art

A common problem with known type devices for converting electrical energy into mechanical energy is that they often times are very inefficient and waste a lot of energy in the conversion process. This is a great disadvantage in today's age when conservation of energy is extremely important.

Another problem with known type engines utilizing electrical magnets for part of their structutre is that the associated slidable solenoid mechanism is normally used just for converting the electrical energy into mechanical drive output without any direct actuation of useful work structure directly from the movable solenoid armature.

SUMMARY OF THE INVENTION

An object of the present invention is to provide an electrical magnetic operated power engine for converting electrical energy into useful mechanical energy.

Another object of the present invention is to provide a magnet powered engine having a plurality of electro-magnetic solenoids with electrical coils and movalbe solenoid armatures therewithin arranged in substantially the same plane and connected with associated mechanical transfer mechanism to convert the movement of the electric solenoid armatures into the desired mechanical power. A suitable timer structure is also associated with this mechanical structure for controlling the time and degree of energization of the respective electric-magnet coils for the various electro-magnetic solenoids.

A further object of the present invention is to provide an electro-magnetic solenoid engine structure which incorporates and has combined therewith a mechanical sturcture for compressing air at atmospheric pressure to a greater pressure for direct conversion of the electrical source power into a useful product.

An additional further object is to provide an electromagnetic type engine which includes a plurality of electromagnetic coils in assoicated timing structure arranged in substantially the same plane, with two or more of these structures being stacked one upon the other in order to greatly increase the overall output of the entire structure.

The magnet power engine and air compressor combination of this invention has a number of new and unique features not known or used before. A basic support structure is provided having at least one bank of electromagnetic solenoids arranged in substantially the same plane thereon. Each electro-magentic solenoid has a slidable and movable solenoid armature therewithin which is mechanically operated and connected to associated mechanical structure for converting the slidable movement thereof into a rotary shaft power output. A timing mechanism is also associated with this mechanical structure for appropriately connecting the electrical power source to at least one electromagnetic coil, and preferably a plurality of same, so that they will operate in proper timing for directing the slidable movement of the solenoid armature back and forth within the solenoid electro magnetic coil.

Also preferably combined with the aforesaid structure is an attachable cylindrical sleeve structure having a slidable piston therewithin and appropriate air valves for connection with the slidable solenoid armature so that useful work may be directly accomplished such as by compressing atmospheric air to a much higher desired pressure. This structure may be provided for each of the electro-magnetic solenoids, or on less than all of same.

These together with other objects and advantages which will become subsequently apparent, reside in the details of constructuon and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a side elevational view of this invention.

FIG. 3 is a cross-sectional view of an individual electro-magnetic unit for the motor of this invention.

FIG. 6 is a cross-section of a single solenoid engine unit with air compressor attachment.

FIG. 7 is a top plan view of the air compressor head end of FIG. 6.

DESCRIPTION OF THE PREFERRRED EMBODIMENT

Figure 1:
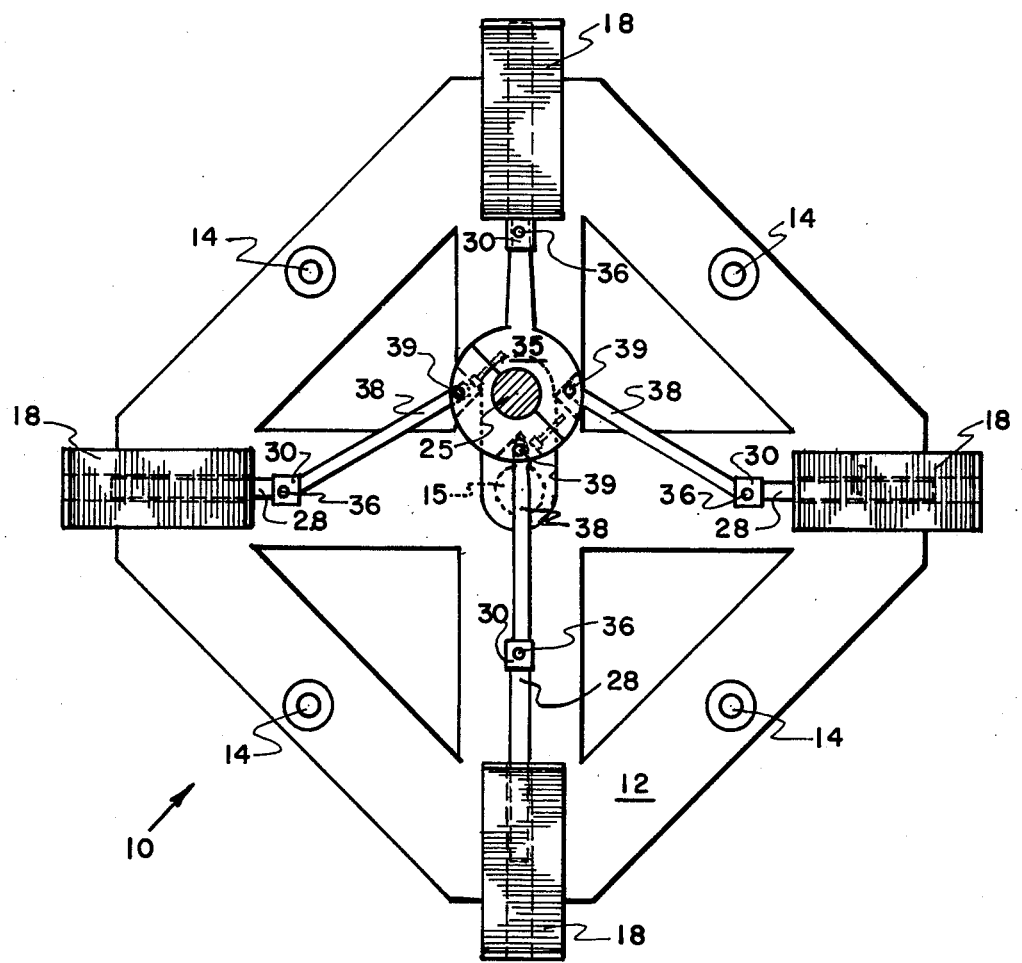
FIG. 1 is a top plan view of the device of this invention.

Looking at FIG. 1 of the drawings, reference numeral 10 indicates one bank of the electro-magnet motor of this invention. Looking at FIG. 2, two banks, one being stacked on top of the other may be seen.

Each bank basically is provided with a support structure 12 approximately square in shape with two of said support squares being provided for each engine bank. Appropriate spaces separate these support squares and together with nuts and bolts 14 form the basic support for each engine bank. As may be best seen in FIG. 2 the lower must bank is supported from any desired support surface by means of another support structure 22 with appropriate bolts 24. Support brackets 17 appropriately mounted on the respective squares 12 support the respective electro-magnet coils 18 therebetween. As seen in FIG. 1, this bank is provided with four electro-magnets appropriately spaced at the four corners of the square support frame. It has been discovered in actual practice that a bank of four electro-magnets works extremely well and provides a fairly balanced power output. Each electro-magnet coil 18 is provided with a suitable number of coil windings to effect the slidable movement of a centrally mounted solenoid armature 28 therewithin.

As best seen in FIG. 3, the one end of the solenoid armature 28 is appropriately center tapped for reception of a threaded screw 32 therewithin. This threaded screw 32 appropriately secures a block of aluminum or other non magnetic material 30 to this end of the armature. The block 30 forms a connecting link through suitable apertures provided therewithin and by means of a connection of a pin 34 with locknut 36 thereon to a connecting rod portion 38. This connecting rod 38 is suitably pivoted at 39 to the disc 35 which is mounted so as to transfer power to the connecting rod crank 25. The connecting rod crank 25 is suitably formed at appropriate points along a crank-shaft 15 as best seen in FIG. 2. If only a single engine bank is to be used just a single crank-shaft throw 25 is necessary, but for an engine having two engine banks as seen in FIG. 2, two such throws are required and as the number of banks increases, the corresponding number of crank-shaft throws is necessitated.

Figure 4:
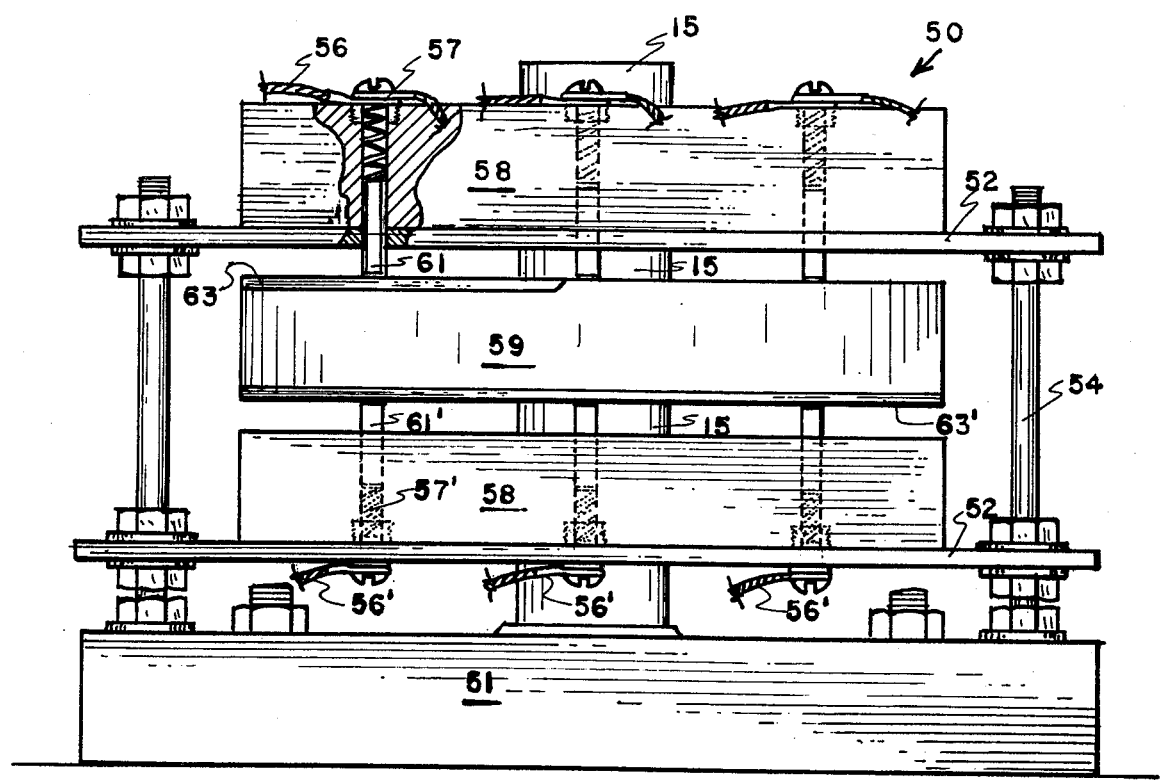
FIG. 4 is an enlarged cross-sectional view of the timing switch mechanism for the motor of this invention.

In operation as the electro-magnets are energized in proper sequence, the electrical input will be transformed into mechanical output through the afore described mechanism. In order to assure that the electromagnets are operated in proper time relationship a timing mechanism is also provided. Such timing mechanism is indicated in general by reference numberal 50 in FIG. 2, and shown in enlarged detail in the cross-sectionalview of FIG. 4.

A mechanical coupling unit 51 appropriately supports the timing mechanism at one end of the electromagnet motor and by means of appropriately threaded bolts 54 support plates 52 therefrom. The plates 52 are spaced from each other and each supports thereupon insulator blocks 58. These blocks support electric connectors 56 which in turn connect with bias springs 57 and electrical brushes 61. The insulating blocks 58 are fixed upon the supports 52 and are non-roatable, but the center disc 59 supported therebetween is mounted for driven connection from the end of the crankshaft 15. Each side of the rotatable disc 59 is provided with conducting segments 63 which are internally connected to each other so that the electrical energy connected to input contacts 56 on the upper side of the timing mechanism may be appropriately transferred through springs 57, brushes 61 through the segment 63 to the lower brushes 61, springs 57' and contacts 56' which are appropriately connected to the respective electro-magnets of the engine. Of course the segment 63, 63' are appropriately designed for the number of electro-magents used for the respective banks as well as the total number of such banks and are connected by appropriate wiring, not shown, in such a manner that each electromagnet will be energized for substantially the full stroke of its slidable solenoid armature and thus transfer the maximum of energy from electrical form to mechanical form.

Figure 5:
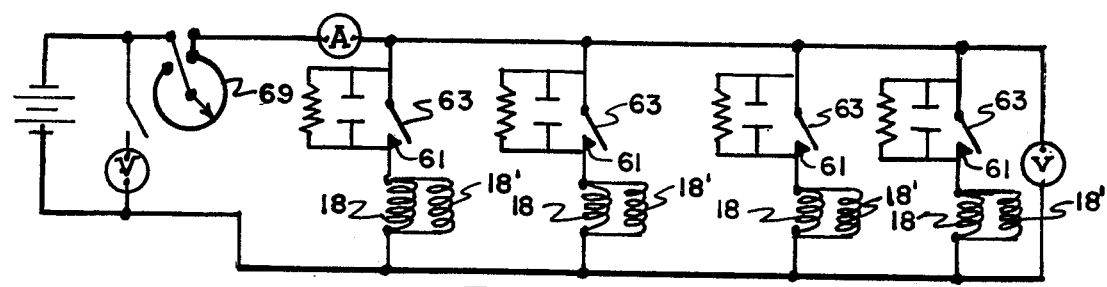
FIG. 5 is a schematic diagram of the electrical hookup for a four unit single bank of the motor of this invention.

FIG. 5 shows an electrical schematic with one of the electro-magnet solenoids having coils 18 and 18' indicated and with contact brushes 61 and timing segment 63 indicated schematically. Also shown across the timing contact 61, 63 are resisters and capacitors in parallel. The purpose of this is to minimize arcing of the make and break contacts of the respective brushes and contact segments.

Figure 8:
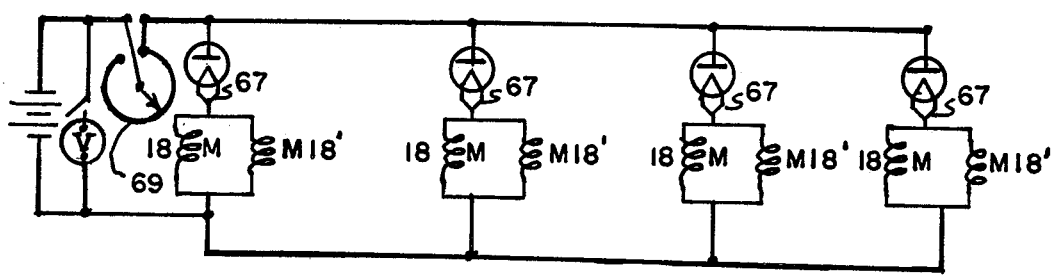
FIG. 8 is a schematic diagram of an alternate electronic electrical hookup for the motor.

FIG. 8 shows an alternative form of energizing the electro-magnet solenoids which is generally referred to as a solid-state switching and which is actually performed by diodes 67. The current entering the solenoids may be regulated by the rheostates 69 as shown in FIGS. 5 and 8.

Looking at FIG. 2 on the right side thereof, an air compressor sleeve 46 is shown appropriately secured by clamp means 66 to one of the electro-magnet structures.

FIG. 6 shows this structure in enlarged detail. The outer end of the solenoid armature 28' is appropriately tapped for reception of a threaded bolt 72 therewithin The enlarged head of the threaded bolt together with a spacer sleeve 73 appropriately support a flat piston member 75. This piston member 75 may be appropriately provided with a compression ring 76 of conventional type. The clamp structure 66 to secure the sleeve 46 at the end of the electro-magnet is preferably provided with a thumb nut 68 or the like to secure same. The other end of the sleeve 46 has an outstanding flange periphery 47 for suitably securing a cylinder head 48 thereto. Appropriate bolts and nuts 49 together with suitable gaskets form an air-tight seal between the head 48 and the sleeve 46, 47. For proper compressing operation to be effected, it is necessary that suitable valve mechanism be associated with this compressor structure. This is in the form of a flexible diaphragm 86 which is secured around the circumference thereof between the head 48 and the flange bracket 47. At the center of the flexible diaphragm 86 is mounted a cone shaped protrusion 87 which together with an aperture 88 provided in the center of the head 48 functions as a one way intake air valve. That is, when the piston 75 is moving away from the head and the diaphragm, air will be drawn into the inside of the cylinder sleeve 46 through the aperture 88, and then in turn on the compression stroke of the head 75 the protursion 87 will seal aperture 88 and then the escape of air out this opening wil be prevented. Another outlet 90 appropriately connected by tubing 92 to a one way check valve 94 provides an outlet for the compressed air and yet prevents backflow thereof. All or some of the connecting tubing 92 may be of a flexible nature as desired.

As can be readily envisioned, when one or a plurality of the electro-magnets are provided with such air compressor sleeves, a direct useful engine output in the form of air under high pressure is achieved. As so constructed, the entire apparatus may be used solely for providing compressed air for various useful purposes. However, by connecting suitiable work apparatus to the output of crank-shaft 15, near the timing mechanism 50, other devices may be driven from this electro-magnet structure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. An engine combination comprising a plurality of electro-magnetic coil means for operating a like number of solenoids for converting electricity to mechanical power, a first separate bank of electro-magnetic coils and solenoids arranged about a single crank shaft and mounted upon a supporting plate to form a single power unit, and a base for supporting said first electric power unit and at least a second set of electro-magnetic coils and solenoids arranged about a second single crank shaft and mounted upon a second single plate to form a second single power unit positioned above said first power unit, and means for connecting one end of the crank shaft of the first power unit to one end of the crank shaft of the second power unit, a single timing mechanism arranged to connect all of the said electromagnetic coils in proper sychronization with each of the said power units, each of the power unit supporting units having means extending upwardly from the base for supporting the said plates supporting each of the power units, and means for connecting the said coils in each bank with a source of electric energy.

2. A structure as claimed in claim 1 wherein a single timing unit having an armature is mounted adjacent the upper end of the crank shaft of the upper bank of electro-magnetic coils and solenoids and connected to all the coils of the electro-magnets at the proper points in relationship to the position of the single solenoid armature.

3. In a structure as claimed in claim 1 including an attachable and removable cylindrical sleeve for at least one of said electro-magnets having a gas compressor means in the form of a reciprocating piston, said piston having means for connecting the same to the solenoid armature for operating said compressor piston, the outer end of said sleeve having an intake valve in the form of a diaphragm.

* * * * *